Oct. 20, 1970 D. J. SHUMATE 3,535,085
CLOSED SYSTEM GENERATION AND CONTAINERIZATION OF RADIOISOTOPES
Filed Aug. 7, 1967
2 Sheets-Sheet 1

Donald J. Shumate
Inventor
Koenig, Senniger,
Powers and Leavitt,
Attorneys.

United States Patent Office 3,535,085
Patented Oct. 20, 1970

3,535,085
CLOSED SYSTEM GENERATION AND CONTAINERIZATION OF RADIOISOTOPES
Donald J. Shumate, Glendale, Mo., assignor to Mallinckrodt Chemical Works, St. Louis, Mo., a corporation of Missouri
Filed Aug. 7, 1967, Ser. No. 658,872
Int. Cl. G21f 5/00
U.S. Cl. 23—252
8 Claims

ABSTRACT OF THE DISCLOSURE

A generator and process for obtaining a sterile daughter radioisotope solution from a parent radioisotope. The generator includes a center chamber containing the parent radioisotope, an upper chamber closed by a rubber stopper for injection of a sterile eluant, and a lower chamber closed by a rubber stopper for receiving the eluate solution from the center chamber. A fritted glass filter separates the center and lower chambers. The sterile eluate containing the dissolved daughter radioisotope is drawn from the lower chamber into an evacuated sterile vial via a tube fitted at each end with a tubular needle, the vial being closed by a rubber stopper.

BACKGROUND OF THE INVENTION

This invention relates to the generation and containerization of radioactive isotope solutions, and more particularly to the sterile containerization of such solutions obtained as the eluate from a closed system isotope generator.

The invention is particularly concerned with the preparation and containerization in a sterile closed system of a solution of a daughter radioisotope, such as technetium-99m, generated from a parent radioisotope, such as molybdenum-99. Conventionally, the preparation of a daughter radioisotope from a parent radioisotope has been carried out using a generator containing the parent radioisotope and an anion exchange medium or other medium, such as alumina, having a high adsorptive capacity for the parent radioisotope but a low adsorptive capacity for the daughter radioisotope. The desired daughter radioisotope is eluted by washing with a suitable solvent or eluting solution such as a sterile, pyrogen-free isotonic saline solution. The resulting eluate solution containing the daughter radioisotope in the form of a dissolved salt is useful as a diagnostic agent, for example, and is adapted for intravenous or oral administration.

The generator containing the parent radioisotope adsorption medium for eluting the daughter radioisotope is frequently referred to in the art as a "cow," and the elution of the daughter radioisotope therefrom is generally referred to in the art as "milking the cow."

Some widely used daughter radioisotopes have relatively short half-lives, e.g., six hours, and it is important, therefore, that the radioisotope be generated or prepared shortly before usage in the hospital, clinic or other place of use. While satisfactory generators or "cows" have been available heretofore, the preparation of daughter radioisotopes therefrom has nevertheless presented problems since it is necessary for the user to maintain a shielded workspace in which to carry out the generation or "milking" process. In some instances this problem has been met by establishing in a separate room the requisite facilities for avoiding contamination and reducing radiation exposure to personnel, but such facilities are costly. Also, it is necessary to generate and containerize the desired radioisotope in such a manner as to provide a sterile solution ready for intravenous use, and this has heretofore required the institution of special procedures.

A generator which has been found to be extremely effective in overcoming the above-noted problems is described and claimed in copending application Ser. No. 571,466, filed Aug. 10, 1966, now U.S. Pat. No. 3,446,965 and assigned to the same assignee as the present invention. Although this generator has been highly successful, it is possible, under certain conditions, to inadvertently contaminate the eluate produced thereby since the generator and containerization unit do not provide a completely closed system. In addition, it is necessary to manually manipulate the containerization unit after elution of the daughter radioisotope for collecting the eluate, thereby increasing the user's radiation exposure.

SUMMARY OF THE INVENTION

Among the several objects of the present invention may be noted the provision of an improved closed system method and apparatus for generating and containerizing a solution of a daughter radioisotope; the provision of such a method and apparatus which produces a solution of a daughter radioisotope in a sterile condition ready for usage; the provision of a method and apparatus of the character described which satisfies radiation safety requirements; the provision of such a method and apparatus which minimize operator handling and exposure; and the provision of a method and apparatus of the class described which are simple, reliable and economical to use.

In general, apparatus of this invention for eluting a daughter radioisotope from a parent radioisotope comprises a generator having a first chamber containing the parent radioisotope and a second chamber below the first chamber, the second chamber being closed at its open lower end by a closure adapted to be pierced by a needle for drawing off the eluted daughter radioisotope. In addition, means are disposed between the first and second chambers for filtering the eluted daughter radioisotope. Other objects and features will be in part apparent and in part pointed out hereinafter.

BRIEF DESCRIPTION OF THE DRAWING

Corresponding reference characters indicate corresponding parts throughout the several views of the drawings.

DESCRIPTION OF THE PREFERRED EMBODIMENT

Figure 1:
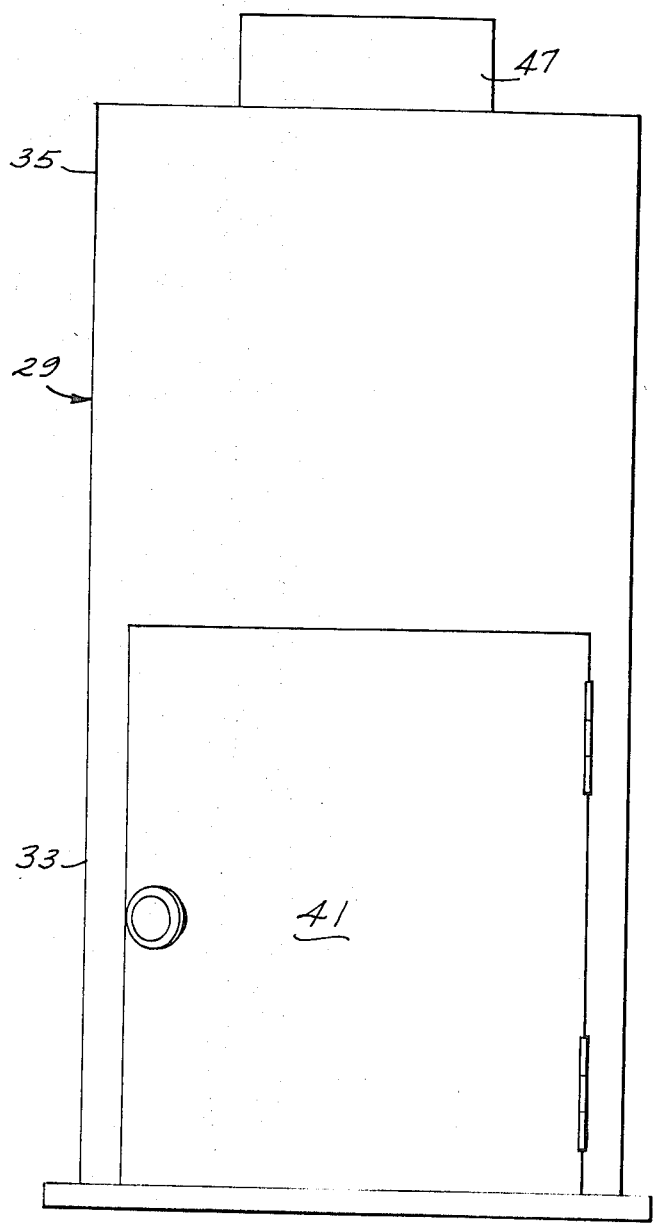
FIG. 1 is a view in elevation of a shield used in conjunction with the invention.
Figure 3:
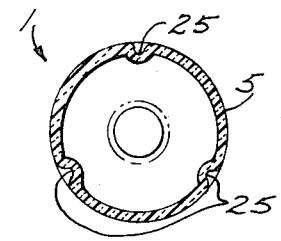
FIGS. 3–5 are horizontal sections taken, respectively, on lines 3—3, 4—4 and 5—5 of FIG. 2.
Figure 4:
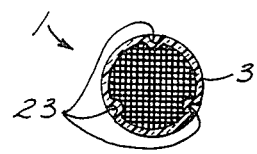
Figure 5:
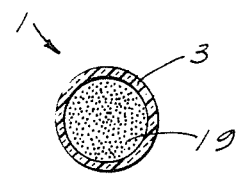
Figure 2:
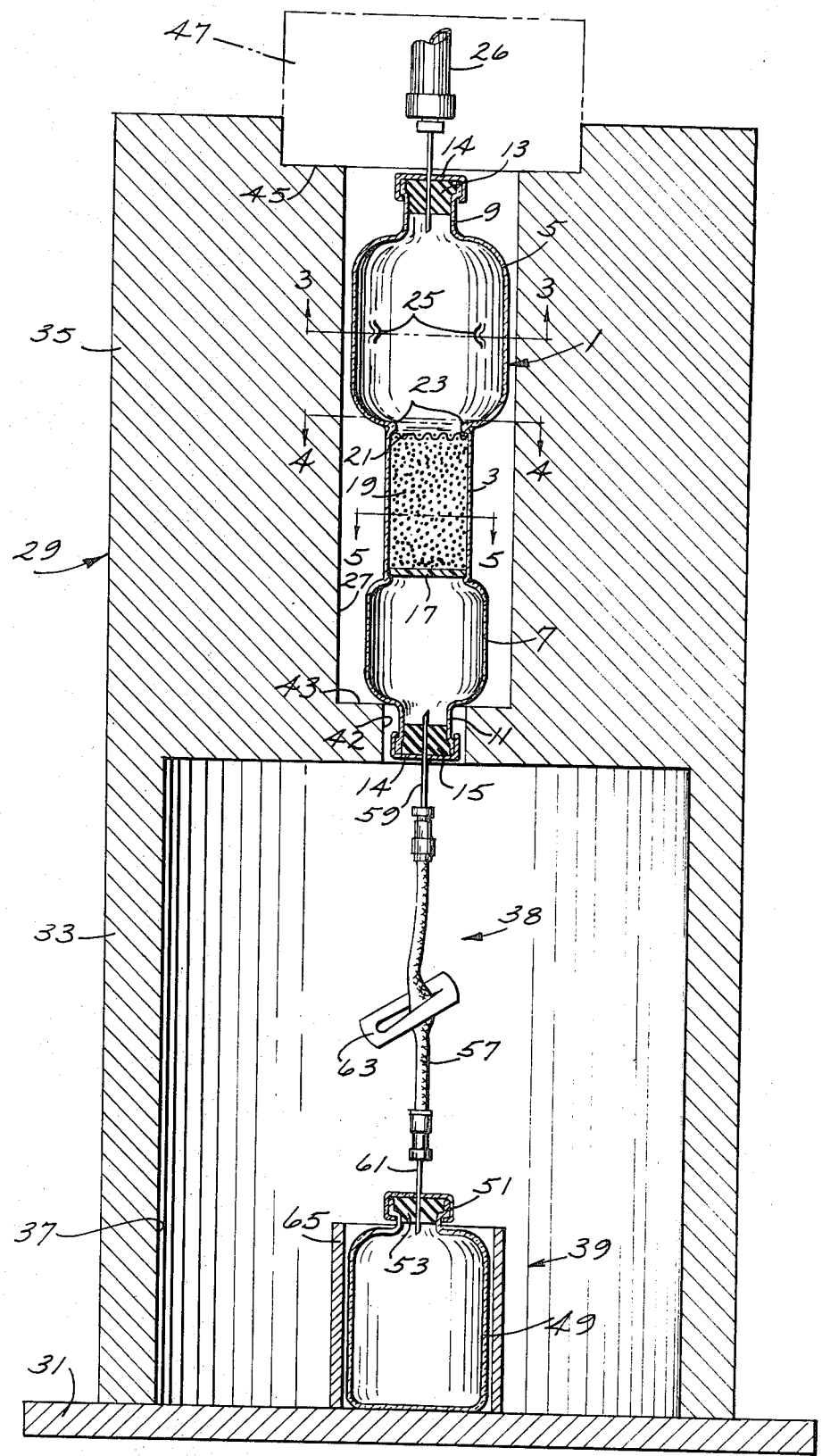
FIG. 2 is a vertical section through the shield, on a larger scale than FIG. 1, showing a generator and a containerization unit of the invention in place in the shield.

Referring to the drawings, there is indicated at 1 in FIGS. 2–5 a generator or "cow" for elution of a daughter radioisotope from a parent radioisotope. As shown, this generator comprises a glass column having a first or center chamber 3, a second or lower chamber 7 and a third or upper chamber 5. The upper and lower chambers 5 and 7 are formed, respectively, with open-ended necks 9 and 11 receiving closures, such as rubber stoppers 13 and 15, each covered by a foil 14, e.g., aluminum foil, having a portion adapted to be peeled away at its top to expose the stopper for piercing by a needle. A fritted glass filter 17 is lodged in the center chamber 3 adjacent its lower end just above the lower chamber 7. Packed in the center chamber on this filter is a charge 19 of the parent radioisotope adsorbed on an anion exchange medium, alumina or other suitable medium having, under suitable conditions, a high adsorption capacity or affinity for the parent radioisotope but a lower adsorption capacity for the daughter radioisotope. The charge is retained in the chamber 3 by a screen 21 lodged in the chamber between the top of the charge and a plurality of inwardly extending protuberances or dimples 23 formed in the column at the juncture of the center and upper chambers (FIGS. 2 and 4). If a larger quantity of the charge 19 is desired, it may extend into the upper chamber 5 and be retained therein by a larger diameter screen lodged in the upper chamber between the top of the charge and a plurality of similarly inwardly extending dimples 25 (FIGS. 2 and 3). For generation of technetium-99m, for example, the charge 19 may comprise molybdenum-99, in the form of ammonium molybdate, as the parent radioisotope adsorbed on alumina, the latter constituting a medium having a high adsorption capacity for ammonium molybdate Mo-99 but a low adsorption capacity for the daughter technetium-99m compound in the presence of certain known eluting solutions.

Center chamber 3 is of smaller diameter than the diameter of lower chamber 7 which is of still smaller diameter than upper chamber 5. The generator is adapted for elution ("milking") to obtain the daughter radioisotope by injecting an eluant or eluting solution, such as a sterile, pyrogen-free, saline solution, into the upper chamber 5 with a sterile syringe, as indicated at 26, the needle of which pierces the rubber stopper 14. The eluting solution passes through the screen 21 and thence through the charge 19 for eluting the daughter radioisotope from the parent radioisotope, the resultant solution (the eluate or "milk") containing the daughter radioisotope passing through the filter 17 and collecting in the lower chamber 7. In the case of technetium-99m, for example, the daughter radioisotope is present in the eluate as sodium pertechnetate.

For the elution of the daughter radioisotope from the generator 1, the latter is placed in a chamber 27 in the upper end of a shield 29, the latter being made of a dense shielding material, such as lead. The lead may be bonded to a rigid material, such as steel. The steel provides structural stability while the lead shields the technician carrying out the eluting operation from the radioactive emission of the charge 19 in the generator and the radioactive emission of the collected eluate. The shield 29, as shown, comprises an elongate cylindrical lead body, extending upward from a flat circular base 31, having a lower thin-walled section 33 surmounted by an upper thick-walled section 35. The lower thin-walled section defines a relatively large compartment 37 for a containerization assembly consisting of a milker unit 38 and a collection unit 39. This section is provided with a door 41 for insertion of units 38 and 39 in the compartment and removal of units 38 and 39 from the compartment. The upper section 35 is cored out to provide the chamber 27 for the generator 1, this chamber being of elongate cylindrical form extending down from the top of the shield and terminating at a reduced diameter portion 42 having a shoulder 43, the latter constituting a seat for the lower end of the generator 1.

The minimum thickness of shield sections 33 and 35 may be determined by the energy of the radioactive emissions from the daughter and parent radioisotopes, respectively. For example, molybdenum-99 units high energy radiation while the radiation from the daughter technetium-99m is much less energetic. Hence, the relative thicknesses of sections 35 and 33 are as illustrated and discussed. The principles and methods of calculating the necessary shielding for any given parent-daughter pair are well known to those skilled in the art. The thick-walled upper section 35 of the shield has a height somewhat greater than that of the generator 1 so that, when the generator is inserted in chamber 27 with the lower end of lower chamber 7 engaging the shoulder 43, the upper end of the generator is somewhat below that of the shield. Chamber 27 has a counterbore 45 at its upper end providing an annular recess for reception of a lead closure 47 for the upper end of the chamber.

The milking unit 38 and collecting unit 39 provide for the sealed sterile containerization of the eluate flowing from the lower chamber 7 of the generator to a sealed, sterile container or vial 49. The vial, as shown, is a glass bottle having a neck 51 sealed at its upper end by a stopper 53 which is adapted to be pierced by a needle. Stopper 53 is conventionally an aluminum foil-covered rubber stopper of the type described above in connection with stoppers 13 and 15. The container or vial 49, as initially supplied for the containerization operation, is evacuated of air. The milking unit 38 includes a flexible tube 57 formed, for example, of a synthetic rubber-like material such as Tygon, a modified halide polymer, condensation resin, and diene derivative sold by the U.S. Stoneware Company. This tube is fitted at its ends with tubular needles 59 and 61 adapted to be pierced respectively through the stoppers 15 and 53 for suction of the eluate from the chamber 7 into the evacuated sterile vial 49. A wedge or V-clamp 63 is provided for clamping the tube 57 closed. The collecting vial 49 is contained in a cup-shaped lead shield 65 seated on the base 31 of the shield 29.

In the use of the above-described apparatus, generator 1 is sterilized by heat or other suitable means and is then inserted in chamber 27 through the top of the shield 29 by means of suitable tongs or the like. Once the generator is in place in the chamber 27, a suitable retention clip (not shown) may be slipped over the bottom neck of the generator to secure it in place during the elution process. The door 41 of the shield is then opened and the rubber stoppers 13 and 15 in the generator and the rubber stopper 53 in the collecting vial are cleaned by means of a cotton-tipped applicator dipped in an appropriate antiseptic solution. A sterile milker unit 38 is then prepared by clamping the tube 57 closed by slipping the V-clamp 63 into place. The needle 61 on the milker unit is then inserted into the collecting vial 49 by piercing the rubber stopper 53 thereon. The requisite amount of eluting solution or eluant is injected into the upper chamber 5 of the generator by means of the sterile syringe 26, the needle of which pierces the rubber diaphragm 13. The other needle 59 of the milker unit 38 is then inserted into the lower chamber 7 by piercing the rubber stopper 15 and both the milker unit 38 and the collecting unit 39 are inserted in the chamber 37 through the open door. The V-clamp 63 is then released, the door 41 is closed and the closure 47 is applied to the top of the shield. It should be noted that the separate generator chambers 3 and 7 prevent the needle 59 on tube 57 from piercing the filter 17 when inserted through the stopper 15, and from entering the parent radioisotope charge 19. Similarly, the separate chambers 3 and 5 prevent the needle of syringe 26 from piercing the screen 21 when inserted through the stopper 13, and from entering the charge 19. Thus, the needles are always properly positioned in their respective chambers and the possibility of withdrawing a portion of the parent radioisotope charge on the tips of the needles when removed from their stoppers is eliminated.

After all of the eluant has passed through the charge 19 and the resultant eluate has been collected in the vial 49, the door 41 is opened and the tube 57 is clamped closed by means of the V-clamp 63. The milker unit 38 is then disconnected by removing the needles 59 and 61 from the closures 15 and 53, respectively. The collecting unit 39 may then be removed from the shield and the sterile, pyrogen-free eluate may be assayed for use. In passing through the filter 17, the eluate is freed of any solids. It should be noted that the eluate flows rapidly into the collecting vial 49 from the lower chamber 7 because of the vacuum in the vial. It should also be noted that, as the needles 59 and 61 are pulled out of the stoppers 15 and 53, the stoppers immediately reseal themselves and maintain both the generator and the vial sterile. If the vacuum in the collecting vial is inadvertently lost due to the clamp not being secure, or for other reasons, the generator may be milked by simply inserting the needle of a sterile syringe into the stopper 13 at the top of the generator and pressurizing the chamber 5 to force the eluant through the charge into the collecting vial.

It will be understood that the above apparatus may be used for preparation and sterile containerization of solutions of various daughter radioisotopes, especially those having relatively short half-lives, the preparation and containerization of technetium-99m in the form of a solution of sodium pertechnetate from molybdenum-99 being only illustrative of the practice of the invention.

Thus, the generator, milker unit, and collecting vial of the invention provide a convenient yet safe means for obtaining a sterile, pyrogen-free solution of a daughter radioisotope. Since the system is closed, inadvertent contamination of the eluate is prevented. In addition, radiation exposure is minimized since the apparatus need not be handled during elution of the generator.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Apparatus for eluting a daughter radioisotope from a parent radioisotope and for containerizing the resultant eluate comprising an evacuated container having its open end closed by a closure, a generator having a first chamber containing the parent radioisotope, means comprising a third chamber above the first chamber for injecting an eluant into said first chamber, said third chamber being closed at its open upper end by a closure adapted to be pierced by a tubular needle for injection of the eluant, a second chamber below the first chamber for receiving the eluate, said second chamber being closed at its open lower end by a closure, and a tube fitted at each end with a tubular needle, one of the needles being adapted to pierce the closure in the second chamber and the other being adapted to pierce the closure in the container for drawing the eluate from the second chamber into the container.

2. Apparatus as set forth in claim 1 further comprising a filter lodged in the generator between the first and second chambers for filtering the eluted daughter radioisotope.

3. Apparatus as set forth in claim 1 further comprising a screen lodged in the generator between the first and third chambers.

4. Apparatus as set forth in claim 3 wherein said screen is lodged in the generator between the top of the parent radioisotope and a plurality of inwardly extending protuberances formed in the wall of the generator.

5. Apparatus as set forth in claim 1 wherein the diameter of the first chamber is smaller than the diameter of the second and third chambers, and the diameter of the second chamber is smaller than the diameter of the third chamber.

6. Apparatus for eluting a daugter radioisotope from a parent radioisotope comprising a generator having a first chamber containing the parent radioisotope, a second chamber below the first chamber, said second chamber being closed at its open lower end by a closure adapted to be pierced by a needle for drawing off the eluted daughter radioisotope, a third chamber above the first chamber, said third chamber being closed at its open upper end by a closure adapted to be pierced by a tubular needle for injection of an eluant, and means between the first and second chambers for filtering the eluted daughter radioisotope.

7. Apparatus as set forth in claim 6 further comprising a tube fitted at each end with a tubular needle, one of the needles being adapted to pierce the closure in the second chamber and the other being adapted to pierce a closure in an evacuated container.

8. Apparatus as set forth in claim 7 further comprising a clamp on the tube for clamping the tube closed intermediate its ends.

References Cited

UNITED STATES PATENTS

| 2,968,721 | 1/1961 | Shapiro et al. | 250—106 X |
| 3,369,121 | 2/1968 | Bruno et al. | 250—106 |
| 3,156,532 | 11/1964 | Doering et al. | 23—252 |

LELAND A. SEBASTIAN, Primary Examiner

U.S. Cl. X.R.

23—267; 176—16; 250—106; 252—301.1; 424—1